United States Patent [19]

Gunness

[11] Patent Number: 4,765,008
[45] Date of Patent: Aug. 23, 1988

[54] FLAIL-TYPE HONEYCOMB DECAPPER AND METHOD

[76] Inventor: Donald Gunness, P.O. Box 106, Abercrombie, N. Dak. 58001

[21] Appl. No.: 89,523

[22] Filed: Aug. 26, 1987

[51] Int. Cl.⁴ ............................................. A01K 59/02
[52] U.S. Cl. ..................................................... 6/12 A
[58] Field of Search ............... 6/12 A, 12 R; 198/602; 425/314; 83/731

[56] References Cited

U.S. PATENT DOCUMENTS

| | | | |
|---|---|---|---|
| 1,523,963 | 1/1925 | Hodgson | 6/12 A |
| 1,992,058 | 2/1935 | Chrysler | 6/12 A |
| 2,448,775 | 9/1948 | Crane | 6/12 A |
| 2,448,986 | 9/1948 | Ladwig . | |
| 2,531,709 | 11/1950 | Taylor | 6/12 A |
| 2,580,397 | 1/1952 | Bogenschutz . | |
| 3,388,409 | 6/1968 | Hettrick | 6/12 A |
| 3,664,219 | 5/1972 | Vrijma | 198/602 X |
| 3,735,433 | 5/1973 | Smith | 6/12 A |
| 3,737,931 | 6/1973 | Hodgson | 6/12 A |
| 4,234,986 | 11/1980 | Cox et al. | 6/12 R |
| 4,557,005 | 12/1985 | Rossmo | 6/12 A X |

Primary Examiner—Robert P. Swiatek

[57] ABSTRACT

An apparatus and method for uncapping wax from both sides of a honeycomb. The apparatus comprises a pair of rotatable flails, a first conveyor for delivering a honeycomb to the pair of rotatable flails and a second endless conveyor for moving the honeycomb from the pair of rotatable flails. The pair of rotatable flails is located in a gap defined between the first and second endless conveyors.

21 Claims, 5 Drawing Sheets

FLAIL-TYPE HONEYCOMB DECAPPER AND METHOD

FIELD OF THE INVENTION

The present invention relates generally to methods and arrangements for decapping wax from cells of a honeycomb, and more particularly to decapper devices which remove wax from both sides of a honeycomb simultaneously.

BACKGROUND OF THE INVENTION

A conventional procedure in the extraction of honey from the comb is to remove the cell-waxcaps of the comb with a special knife heated by steam or electricity. Because honeycombs are often rough and uneven, this procedure is found to be tedious and oftentimes wasteful of honey. Accordingly, machines have been developed to automatically decap honeycombs without specific use of a heated blade.

One such devices is set forth in U.S. Pat. No. 2,448,775 to Crane (Sept. 7, 1948). Crane discloses an endless conveyor having spaced lugs for receiving individual honeycombs. Each honeycomb is moved by the conveyor through a station including a pair of rotating brushes and a spring loaded shoe having curved end portions which serve to hold the honeycomb frame snugly in place as it passes through the brushes. The rotating brushes act on both sides of the honeycomb frames simultaneously.

The usefulness of the Crane device is limited to sizes of honeycomb frames which fit between the space lugs of the conveyor. Additionally, the decapping action of the brushes takes place adjacent the conveyor. Consequently, the Crane design limits the transverse extent of its brushes so as to avoid imposing action of the brushes upon the conveyor. Otherwise, the brushes would cause accelerated wear and possibly premature failure of the conveyor with the reach of the brushes being limited, the spring loaded shoe of Crane is necessary for properly locating the honeycomb frame relative to the brushes. The arrangement also limits effectiveness for decapping honeycomb cells located adjacent the honeycomb frame.

U.S. Pat. No. 2,448,986 to Ladwig (Sept. 7, 1948) shows a comb decapper device in which a honeycomb frame is placed on a carriage which slides along a pair of rails over a drum having prongs which perform the decapping operation. Again as in Crane, the transverse extent of the prong drum is limited by the presence of the railed transport arrangement which must pass thereby. Otherwise, the pronged drum would work upon the carriage and create an undesirable degree of wear upon the carriage. This shortcoming makes it difficult to decap honeycomb cells located adjacent the honeycomb frame.

Ladwig also teaches the use of prongs as an alternative to the use of brushes, because brushes soon become clogged with wax and honey and become ineffective and unsanitary unless cleaned frequently.

However, the prongs of Ladwig which are intended to overcome the wire brushes, create problems of their own in that precautions must be taken to avoid their striking the honeycomb frame and the frame conveying arrangement because of the increased amount of damage that the rigid prongs would inflict on those elements.

U.S. Pat. No. 1,523,963 to Hodgson (Jan. 20, 1925) discloses a decapping device for honeycombs which includes rotating brushes which act on opposite sides of the honeycomb. In the Hodgson device, the honeycombs are individually moved horizontally in a frame between the rotating brushes. Accordingly, the arrangement is suited for only a specific size of honeycomb frame. As with the other prior arrangements, the Hodgson supports the honeycomb at only limited regions of the honeycomb frame, which situation concentrates stresses on the frame.

SUMMARY OF THE INVENTION

Accordingly, an object of the present invention is to provide a flail-type honeycomb decapper device in which the flailing device may be extended across the entirety of a delivery path of the honeycomb frames, without risking premature failure of the conveyor.

Another object of the present invention is to provide a flail-type honeycomb decapper device in which the conveyor is spaced away from the flailing element, yet positive feeding of the honeycomb frames through the flailing elements is achieved.

Still another object of the present invention is to provide a flail-type honeycomb decapper which can accept a wide variety of honeycomb frame sizes.

Another object of the present invention is to provide a flail arrangement in a honeycomb decapper which is resistive to becoming clogged, yet does not ruin a honeycomb frame if it should strike same during a decapping process.

Yet another object of the present invention is to provide a decapping arrangement which is effective uniformly across the entirety of the honeycomb frame, including the regions adjacent the frame members.

Still another object of the present invention is to provide an arrangement which reduces the amount of stresses applied to honeycomb frames during the decapping process.

Still another object of the present invention is to provide an arrangement for decapping honeycombs which may accept a broad range of types and sizes of honeycomb frames without adjustments or expenditures of time for set-up.

A further object of the present invention is to improve operator productivity permitting horizontal feeding of honeycomb frames and without having to specifically locate each frame between conveyor lugs, catches or the like.

Another object of the present invention is to improve operator productivity by permitting simultaneous uncapping of multiple honeycomb frames with a same flailing element.

Another object of the present invention is to provide an arrangement for effecting additional honey extraction while removing less wax from cell walls so as to reduce the amount of reconstruction that the bees must perform in the following season.

These and other objects are achieved by the present invention which provides an apparatus suitable for uncapping wax from both sides of a honeycomb, comprising first and second conveyors for moving a honeycomb along a path and flail means for uncapping the honeycomb. The present invention provides further that the first and second conveyors are located in succession along the conveyance path and are spaced apart so as to define a gap between the first and second conveyors. The flail arrangement uncaps both sides of the hoenycomb as the honeycomb is moved across the gap.

More particularly, the present invention provides an apparatus for uncapping wax from both sides of a honeycomb, which comprises a pair of rotatable flails arranged to receive honeycomb in a nip defined between the flails and a first endless conveyor for delivering honeycomb along a delivery path to the pair of rotatable flails. The first endless conveyor is spaced from the nip in a direction of the delivery path. The invention provides further a second endless conveyor for moving honeycomb away from the pair of rotatable flails along a removal path, with the second endless conveyor being located opposite of the flails from the first endless conveyor, together and with the second endless conveyor being spaced from the nip in the direction of the removal path. So arranged, the pair of rotatable flails are located in a gap defined between the first and second endless conveyors. Included are arrangements for driving the first and second endless conveyors and arrangements for rotatably driving the pair of flails.

The present invention also sets forth a method of uncapping wax from both sides of a honeycomb comprising the step of conveying a honeycomb along a path including first and second conveyors. The method further comprises the step of flailing both sides of the honeycomb at the gap free of interference from the first and second conveyors.

BRIEF DESCRIPTION OF THE DRAWINGS

Other objects, advantages and novel features of the present invention will become apparent from the following detailed description of the invention when considered in conjunction with the accompanying drawings, wherein.

DETAILED DESCRIPTION OF THE PREFERRED EMBODIMENTS

Figure 1:
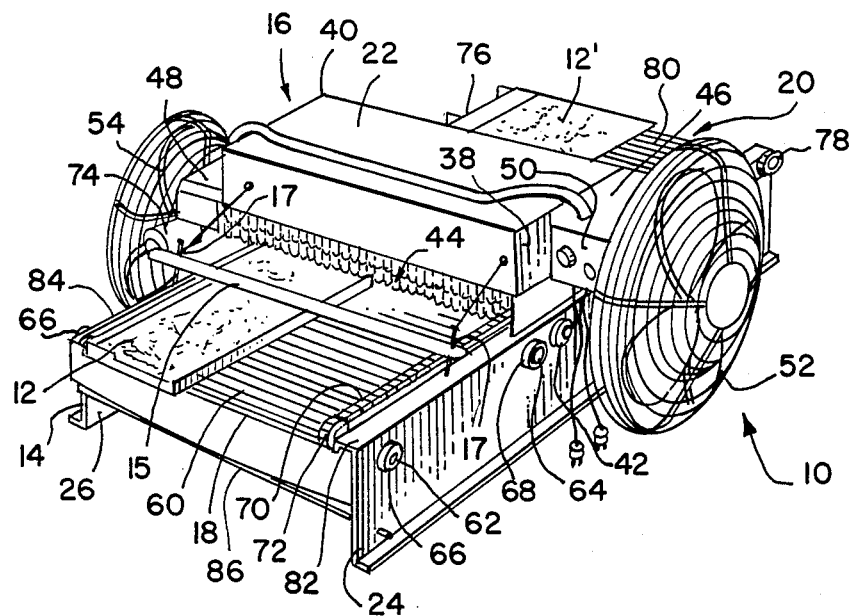
FIG. 1 is a perspective view of a flail-type honeycomb decapper constructed according to a preferred embodiment of the present invention.

Referring to FIG. 1, a preferred embodiment of the present invention provides a flail-type decapper apparatus 10 for decapping wax from opposite sides of a honeycomb 12 simultaneously. The decapper apparatus 10 includes a frame 14, a flail assembly 16 supported centrally on the frame 14, a first conveyor 18 for delivering honeycombs 12 to the flail assembly 16 and the second conveyor 20 for removing decapped honeycombs 12' from the flail assembly 16.

Figure 2:
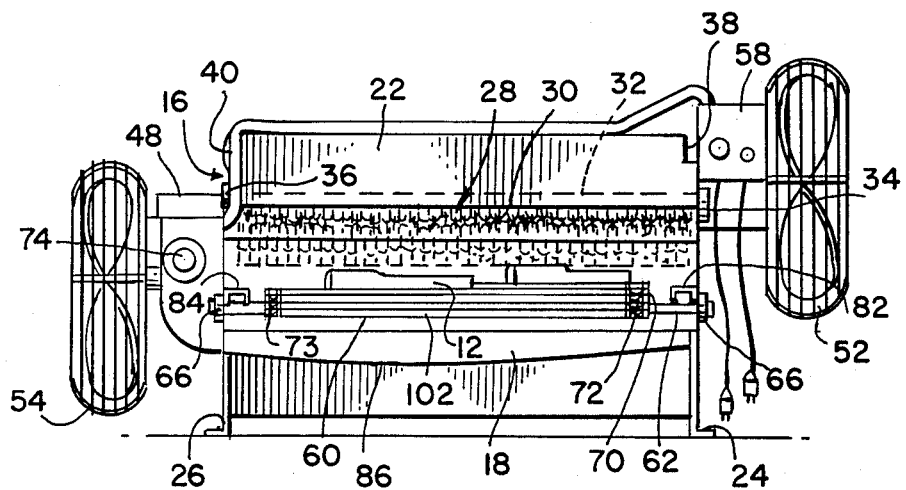
FIG. 2 is an end view of the decapper apparatus of FIG. 1.

Referring also to FIG. 2, the flail assembly 16 includes an open-bottomed cover 22 which is secured to and supported above the longitudinal frame members 24 and 26. The top cover 22 houses an upper chain flail element 28, together with the cover 22, which extends transversely across the path defined by the first and second conveyors 18 and 20. The flail element 28 comprises several rows of chain pieces 30 attached to a rotatable shaft 32 so that as the shaft 32 rotates, the chain pieces 30 create flailing action. The chain pieces may be No. 35 sash chain or the like, and may be attached by spot welding, rivets or the like.

Bearings 34 and 36 are provided in end plates 38 and 40 for rotatably supporting the shaft 32 relative to the top cover 22. A second set of bearings 42 are provided on the longitudinal frame members 24 and 26 for supporting a second, lower flail element 44. Preferably, the lower flail element is of the same construction as in the upper flail element.

A first variable speed motor 46 is connected by direct drive to the shaft 32 of the upper flail element 28. The first variable motor 46 is preferably supported from the end plate 38 of the cover 22, but could be supported instead directly from the longitudinal frame member 24 or other suitable arrangement. A second variable speed motor 48 is provided for driving the lower flail element 44. It too is connected directly to the driven shaft of the lower flail element 44. Motors 46 and 48 are controlled simultaneously with controls 50 housed adjacent the first variable motor 46. In the preferred embodiment, fans 52 and 54 are attached to the opposite ends of the output shafts of the variable speed motors 46 and 48, respectively. Preferably, each of the variable speed motors 46 and 48 comprise one-half horse power, double shafted G.E. permanent split-capacitor air-over motors. It has been found that this 3-speed motor comes closest to the requirements of motor speed needed for uncapping. The optimum speed is approximately 900 rpm or less for the upper and lower flail elements 28 and 44 of the preferred embodiment. When the flails rotate at this speed, they remove the honeycomb caps easily and effectively without injuring the honeycomb. In fact, it has been found that even if the operator's fingers inadvertently contact the flails, no injury is sustained.

The motor 46 is connected directly with the shaft 32 by the expedient of a bore being provided at the end of the shaft 32 of sufficient diameter to receive the output shaft of the motor 46. The other motor 48 is connected in the same way to the shaft of the second flail element 44. The motors are also connected to fans to provide cooling.

The fans 52 and 54 properly load the three-speed motors 46 and 48 so that the motors will slow down when speeds are switched. Otherwise the motors have a tendency to maintain their speed despite a change in speed settings at the controls 50. Also, the fans are oriented to discharge onto the motors so as to cool the motors 46 and 48, as well as provide comfort to the operator.

Figure 3:
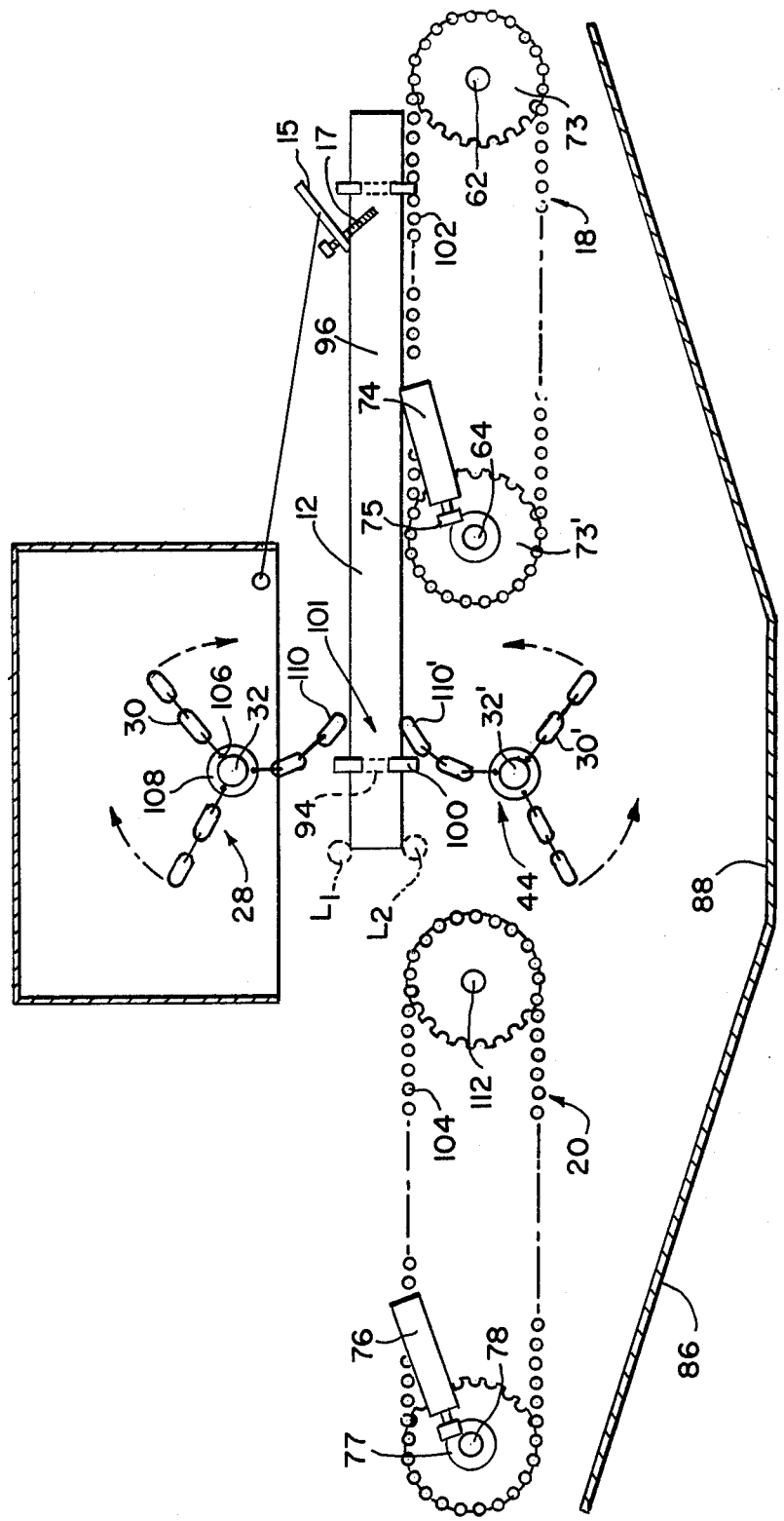
FIG. 3 is a diagrammatic side view of the decapper apparatus of FIG. 1.

Referring now also to FIG. 3, the first delivery conveyor 18 comprises a bakery chain which comprises ½ inch pitch stainless steel belting which is guided about first and second shafts 62 and 64. The shafts 62 and 64 are rotatably mounted to the longitudinal frame members 24 and 26 by bearings 66 and 68, respectively. The bakery chain 60 comprises a plurality of transverse links 102 that are interconnected along the longitudinal edge 70 of the bakery chain 60. Right and left notched wheels 72 and 73 are affixed to the shafts 62 and 64 and mesh with the links of the bakery chain 60. A motor 74 and reduction gears 75 drive the chain 60 at forwardly located shaft 64. This arrangement allows direct drive of the motor 74 to pull the chain 60, as opposed to having it push against the load of honeycombs 12 as would occur if the motor 74 had been connected with the shaft 62.

The second removal conveyor 20 is constructed similarly to the first conveyor 18 but is situated at the opposite side of the flail assembly 16 from the first conveyor 18. A drive motor 76 is provided for directly driving through reduction gearing 77 the forwardly located shaft 78 of the removal conveyor 20. Consequently, the motor 76 pulls the bakery chain 80 of the removal conveyor 20 and the load of decapped honeycomb 12 away from the flail assembly 16.

The frame 14 includes longitudinal rails 82 and 84 located adjacent the longitudinal edges of the chain 60 and 80 to help maintain proper location of the honeycombs 12 upon the chains 60 and 80. A collector plate 86 is located beneath both conveyors 18 and 20 and extends across the space between the frame members 24 and 26. The collector plate 86 is curved concave upwardly so as to define a trough for the collection of honey and wax fragments which fall through from the conveyors 18 and 20 and from the flail assembly 16. A suitable drain is formed at the trough portion 88 of the collector plate 86 for removing the collected substances.

Frame 14 is provided with a hold-down member 15 which is pivotally connected to end plates 38 and 40. Threaded members 17 provided at the opposite end of the hold-down member serve as adjustable stops which contact the rails 82 and 84 to place the holddown member in a rest position at a predetermined distance above the first conveyor 18.

Figure 5:
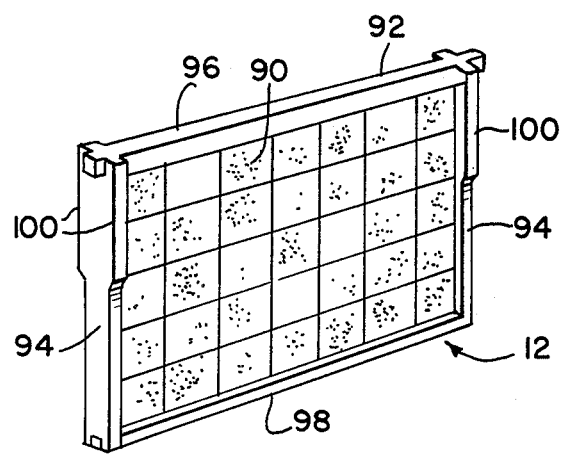
FIG. 5 is a perspective view of a typical honeycomb including a frame.

Referring to FIG. 5, a typical honeycomb 12 includes wax cappings 90 which cover honeycomb cells located within a frame 92. The frame 92 includes end bars 94 and top and bottom rails 96 and 98. The end bars 94 have raised portions 100 which extend outwardly from the plane generally defined by the other portions of the frame 92. The honeycomb frame 92 is conventional and may vary in size depending upon the make and manufacturer.

Referring now to FIG. 3, links 102 of the chain 60 of the delivery conveyor 18 are spaced sufficiently apart to receive the raised edge portions 100 of the honeycomb 12 with clearance so that the raised edge portions 100 extend into the space provided between adjacent pairs of link members 102. Consequently, the honeycomb 12 rests upon and is supported by a plurality of links 102. The spacing of the links 102 also permits at least one of the links to engage a raised portion 100 of a honeycomb 12 so as to assure positive feeding of the honeycomb 18 to the flail assembly 16. The individual links 104 of the second conveyor 20 are spaced similarly.

The feed paths of the endless chains 60 and 80 are arranged along a common plane which passes through a nip 101 defined between the upper and lower flailing elements 28 and 44.

Figure 4:
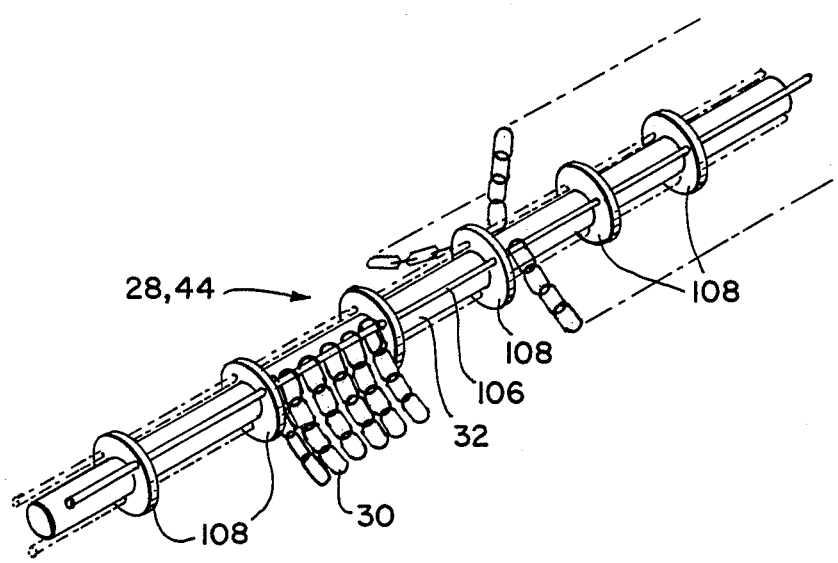
FIG. 4 is a perspective view of the flailing element of the decapper apparatus of FIG. 1.

Referring now to FIGS. 3 and 4, each of the flailing elements 28 and 44 comprises a driven shaft 32 and three transverse rows of chain pieces 30, with each row 30 extending across the entirety of the conveyance path defined by the first and second conveyors 18 and 20. Preferably each piece of chain 110 comprises 4 links (although a greater number or a less number can also be used), with each piece being connected at one end to a rod 106, which in turn is inserted through apertures in a plurality of annuluses or washers 108. The washers 108 are welded to the shaft 32 at spaced locations along the shaft 32 so that the shaft 32 and the washers 108 rotate together. Preferably, there are three rods located symmetrically and parallel to the driven shaft 32. In the preferred embodiment, there are six washers 108 spaced generally equally along the shaft 32, with each rod 106 supporting between the first two washers and the last two washers 108 a total of thirteen pieces of chain. Preferably, the three remaining segments of the rod each hold a total of fourteen pieces of chain pieces 110, so that each row 30 presents chain in groups of 13, 14, 14, 14, and 13 pieces of chain 110. The opposite ends of each piece of chain 110 are unconnected and allowed to extend radially as the driven shaft 32 is caused to rotate by the first and second variable motors 46 and 48.

Preferably, the shafts 32 of the upper and lower flailing elements 28 and 44 are spaced sufficiently apart so that the free ends of the chain pieces 110 do not interfere with each other. Additionally, both of the shafts 32 are located sufficiently from the forward shaft 64 of the first conveyor 18 and the rearward shaft 112 of the second conveyor 20 so as to avoid interference between the free ends of the chain pieces 110 with the conveyors 18 and 20. However, as the first conveyor delivers a honeycomb 12 to the flailing assembly 16, the free ends of the chain pieces 110 come into contact and strike the honeycomb 12 across the entire width of the honeycomb frame 92.

Figure 6:
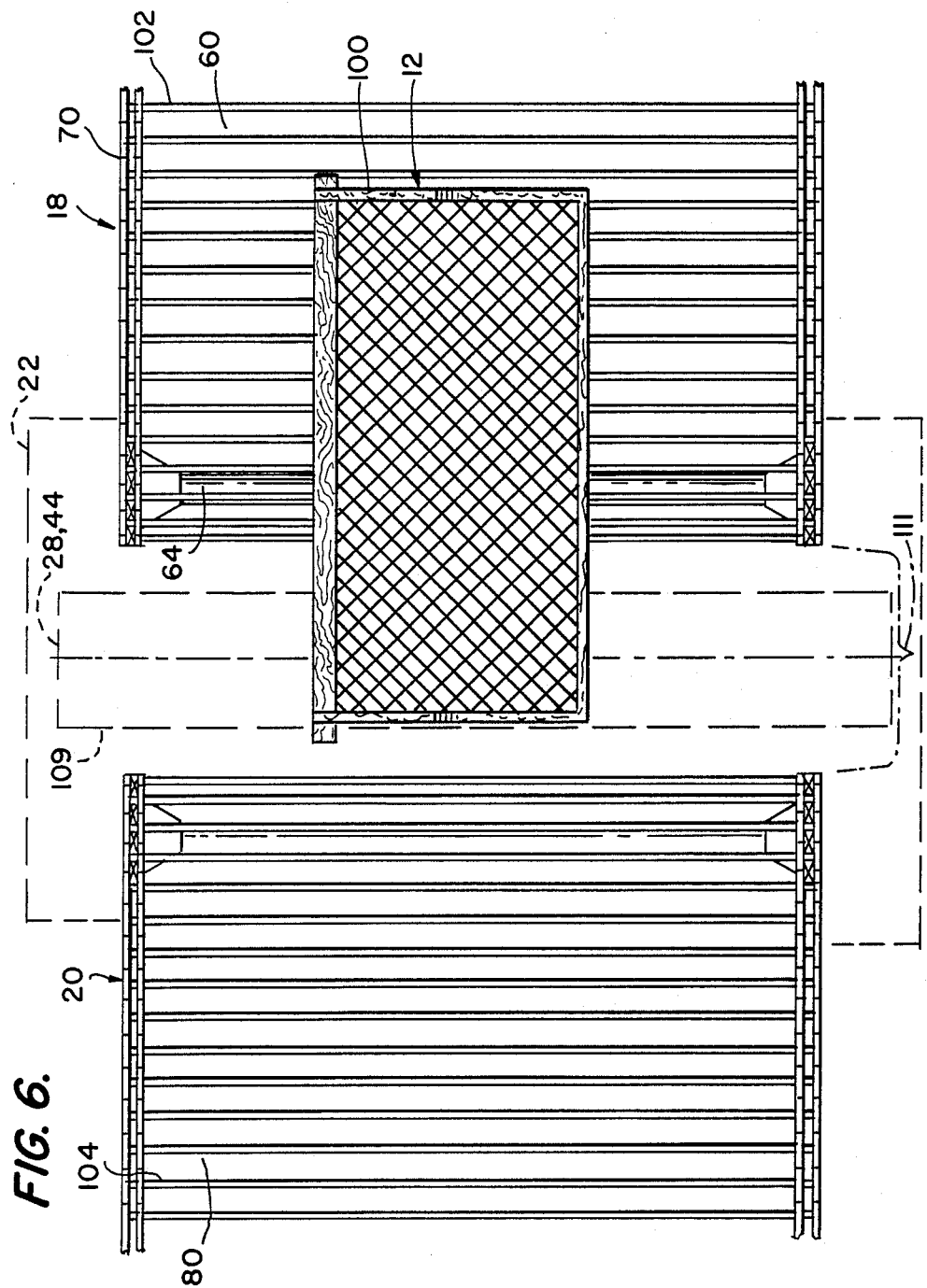
FIG. 6 is a top diagrammatic view of the conveyor arrangement in the decapper apparatus of FIG. 1.

Referring to FIG. 6, the flailing elements 28, 44 are given a width extending entirely across and beyond widths of the first and second conveyors 18 and 20.

Also, the action of the flailing elements 28 and 44, represented by the dashed line 109, does not interfere with the first and second conveyors 18 and 20, nor damage them, because the upper and lower flailing elements 28 and 44 are located in the gap 111 between the first and second conveyors 18 and 20.

Preferably, conveyors 18 and 20 are provided with sufficient width to accept two or more honeycombs 12. Additionally, it is to be appreciated that the conveyors 18 and 20 may accept honeycombs at almost any location along their chains 60 and 80 and in almost any orientation on their sides.

In operation, the flail-type decapper apparatus 10 is preferably arranged waist high to the operator so as to facilitate placement of honeycombs 12 upon the conveyor 18 and to facilitate removal of decapped honeycombs 12' from the conveyor 20. The drive motors 74 and 76 of the conveyors 18 and 20 are turned on, together with the variable speed motors 46 and 48. The speed of the variable speed motors 46 and 48 are selected according to the amount of wax appearing on the face of the honeycombs 12. A higher motor speed is used for decapping a thicker accumulation of wax. During such adjustment, the fans 52 and 54 provide the necessary loading upon the variable speed motors 46 and 48, respectively, so that if a lower speed is selected the fans will slow the motors 46 and 48 down to the desired speed from a higher speed, if necessary.

Thereupon, one or more honeycombs 12 are laid horizontally on their sides upon the first conveyor 18, such that the longitudinal plane of each honeycomb is substantially parallel to the first conveyor and one longitudinal face of each honeycomb is against the first conveyor. The raised frame portion 100 is extended between adjacent pairs of links 102 of the first conveyor 18. As a result, the honeycomb frame 94 is supported by a plurality of links 102 along the length of the upper and lower rail numbers 96 and 98 so as to reduce the concentration of stresses on the honeycomb frame 92. Additionally, there is achieved a mechanical engagement between at least one of the links 102 and the raised portion 100 of the frame so as to provide positive feeding of the honeycomb toward the flail assembly 16.

The hold-down number is inclined relative to the feed path of first conveyor 18 so that as a frame 92 is brought into contact with the hold-down number 15, the hold-down number 15 is urged upwardly so that its rearward edge is caused to slide along the top surface of the honeycomb 12 as the latter progresses toward the flail assembly 16. The resistance provided by the hold-down member 15 helps assure placement of the raised portion 100 into the one of the spaces provided between the links 102 of the first conveyor 18. It also biases the honeycombs 12 against the chain to minimize movement of the honeycombs 12 as they are brought into contact with the upper and lower flailing elements 28 and 44. So arranged, the honeycombs 12 are conveniently guided by the cooperation between the hold-down member, the chain 60 of the first conveyor 18, and the guide rails 82 and 84.

So guided the honeycombs 12 then extend beyond the reach of the first conveyor 18 and into the nip 101 defined by the rotating upper and lower flailing elements 28 and 44. Thereupon, the action of the chain rows 30 upon the faces of the honeycomb 12 breaks up and removes wax from both sides of the honeycomb 12 simultaneously. It is to be appreciated that because the flailing elements 28 and 44 project entirely across the path defined by the first and second conveyors 18 and 20, the flailing elements act upon the entirety of the honeycombs 12 so as to remove wax in all regions of the honeycombs 12, including those regions adjacent the end bars 94 and the upper and lower rails 96 and 98 of the honeycomb frame 92. This result is achieved without the upper and lower flailing elements having to strike and cause damage to elements of the conveyors 18 and 20, which are conveniently spaced sufficiently far from the flailing elements to avoid such contact.

Because the flailing elements comprise rows of chain pieces, each chain piece is allowed to flex and rid itself of bits and pieces of material which would otherwise accumulate as occurs with brushes. Being flexible, the chain pieces do not damage the honeycomb frames 92 in any significant fashion so that the frames 92 are reusable for the next season.

The upper and lower flailing elements rotate in a direction of the feed of the conveyors 18 and 20 the action of the flailing elements 28 and 44 upon the honeycombs 12 as the honeycombs are extended into the gap 111 is such that the flailing elements 28 and 44 provide support to the honeycomb frames 92 and help urge the honeycombs 12 toward the second conveyor 20. In the instances where the flailing elements 28 and 44 are rotating at a speed different from that of the drive wheels of the conveyors 18 and 20, the engagement between the raised portions 100 and one of the link members 102 of the conveyor 18 controls the progression of the honeycombs 12 until such engagement is released. In the preferred embodiment, the release of engagement between the raised portions 100 and links 102 do not occur until after the other raised portion 100 of the honeycombs is engaged with one of the links 104 of the second conveyor 20. This arrangement is preferred in the it causes the honeycombs 12 to pass through the flailing elements 28 and 44 under the control of and at the speed of the first and second conveyors 18 and 20 during their passage across the gap 111.

However, the apparatus can be arranged such that the engagement between the honeycombs 12 and the first conveyor 18 is released prior to engagement of the honeycombs with the second conveyor 20. In that arrangement, the feeding of the honeycomb across the gap 111 is effected primarily by the flailing elements 28 and 44.

The second conveyor 20 readily takes up the flailed portion of the honeycombs 12 as the honeycombs pass through the flailing station 16, because the second chain 80 is allowed to come up and meet the leading edge of the honeycombs 12 at the cogged wheel 112 of the second conveyor. Clashing is avoided because both conveyors 18 and 20 are preferably driven by identical motor and reduction gearing arrangements 74 and 76. Additionally, flexibility of the individual links 102 and 104 alleviate any sort of clashing that might occur when the honeycombs 12 engage the conveyor 20.

The second conveyor 20 receives and provides support to the honeycombs 12 in the same manner as does the other conveyor, and effects withdrawal of the honeycombs 12 from the flailing station 16 to a delivery location at the forward end of the second conveyor 20. Thereupon, the operator may remove the honeycomb from the device for further processing as necessary.

During this whole operation, wax fragments and honey removed from the honeycombs 12 are allowed to pass through the spaces between the links 102 and 104 of the first and second conveyors to collect in the trough 88 of the collector plate 86. The top cover 22 serves to direct material flung from the upper flailing element 28 toward the trough portion 88.

The above described decapper apparatus 10 and the attendant method reduces the rate of attrition of honeycomb frames 94 by imposing lower structural stresses on the honeycomb during the decapping process. In particular, the apparatus 10 works to support the honeycombs 12 and the frames 92 over a greater area and not merely along opposite edges of the frame itself as occurs in many prior art devices. Accordingly, stresses are not concentrated at joints of the frame so that they can withstand many more decapping operations.

Also, the arrangement is workable with all types and sizes of honeycomb frames without requiring adjustment for the size of the frames. However, the provision of the variable motors 46 and 48 permit adjustment for the amount of wax accumulated on the honeycombs 12.

Additionally, because the conveyors do not pass adjacent the flailing elements 28 and 44, and instead the flailing elements are located at a gap between the conveyors, several honeycombs can be arranged in tandem on the same conveyor and be decapped by the same flailing elements 28 and 44.

Figure 7:
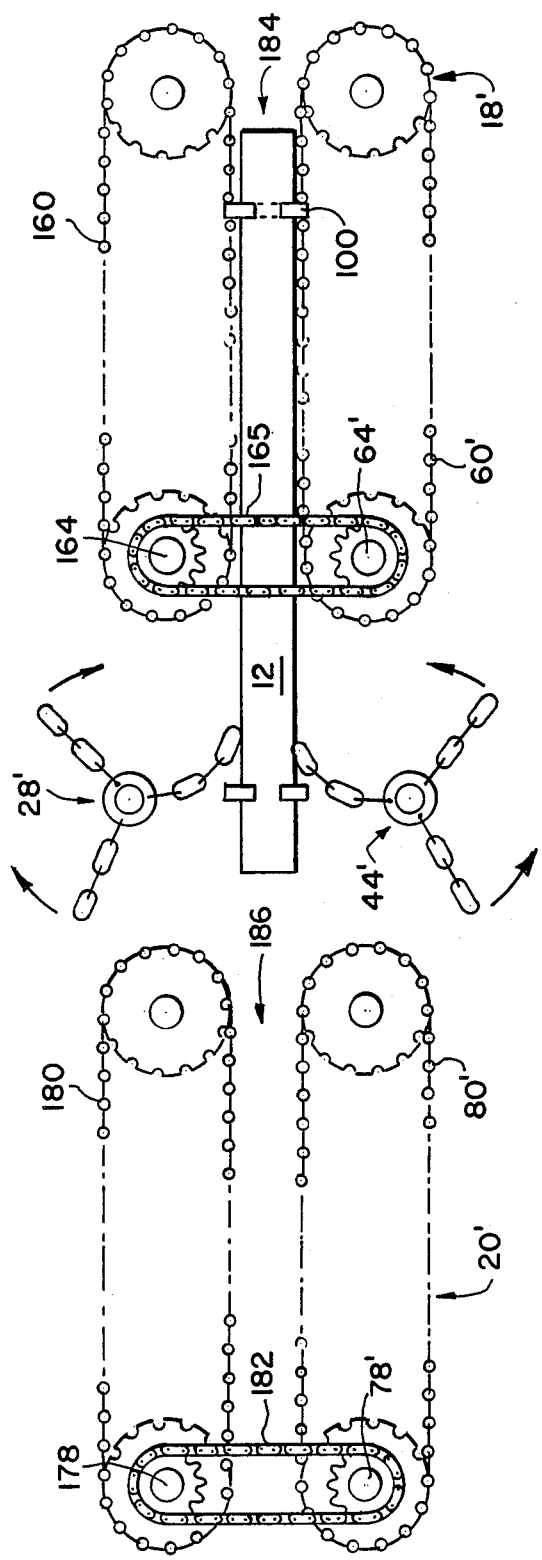
FIG. 7 is a diagrammatic side view of a decapper apparatus constructed according to a second preferred embodiment of the present invention.

Referring to FIG. 7, another embodiment of the present invention includes the modification of providing the first conveyor 18 with a second endless chain 160 in opposing relationship with the chain 60'. Preferably, the second endless chain 160 is driven synchronously with the first endless chain 60' by a belted or chain connection 165 between the drive shaft 64' of the endless chain 60' and the drive shaft 164 of the second endless chain 160.

A second endless chain 180 is likewise provided in opposing relation to the endless chain 80' of the second conveyor 20'. The second endless chain 180 is preferably driven by a shaft 178 drivingly connected with the driven shaft 78' of the endless chain 80' by a belt or chain 182. It is also envisioned to drive the endless chains 160 and 180 by separate direct drive motors.

In this embodiment, the endless chains 60' and 160 are spaced apart so as to receive honeycombs 12 through the opening 184 defined between the endless chains 60' and 160. In that the raised portions 100 of the honeycombs 12 are received by both endless chains 60' and 160 and because both chains are applied against opposite sides of the honeycombs, the conveyor 18' provides a more positive feeding and retention of the honeycombs 12 as they are moved toward the flail assembly 16. This arrangement also avoids the need for the hold down bar 15 of the first preferred embodiment. Likewise, the chains 80' and 180 receive the honeycombs 12 within a space 186 defined therebetween so as to more positively receive and steady the honeycombs 12. Overall, this embodiment assures more accurate feeding of the honeycombs 12 through the flail assembly 16 and steadies the honeycombs 12 against vibration or displacement during the flailing operation.

Another embodiment of the invention contemplates the use of commercially available lasers to remove the honeycomb caps. In this embodiment, the conveyors 18, 20 are spaced closely enough together that the honeycombs may pass from one to the other easily. One laser is positioned above the plane of transport and aimed across the direction of movement of the honeycombs while another laser is positioned below the plane of transport and aimed across the direction of movement. These two lasers are indicated in phantom in FIG. 3 as $L_1$ and $L_2$. The lasers sever the upper and lower caps at the proper location.

It is to be understood that the invention may be embodied in other specific forms without departing from the spirit or central characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. An apparatus suitable for uncapping wax from both sides of a honeycomb, said apparatus comprising:
   first and second conveyor means for moving a honeycomb along a path, said first and second conveyor means being disposed to receive honeycombs laid with a longitudinal plane substantially parallel to at least one of said first and second conveyor means such that said honeycombs are supported with one longitudinal face against said at least one of the first and second conveyor means, said first and second conveyor means being located in succession along said path and spaced apart so as to define a gap between said first and second conveyor means along said path;
   means at least partially disposed in said gap for uncapping both sides of a honeycomb as the honeycomb is moved across said gap.

2. The apparatus as claimed in claim 1, wherein said uncapping means includes means for urging a honeycomb across said gap.

3. The apparatus as claimed in claim 1, wherein said path is horizontal and said first and second conveyors means include means for supporting a honeycomb on one of the sides of the honeycomb so that at said gap the honeycomb is disposed horizontally.

4. The apparatus as claimed in claim 3, wherein said first and second conveyor means comprise endless belts of spaced apart, transverse links, said spaced apart links adapted to permit material from a honeycomb to pass between said links.

5. An apparatus as claimed in claim 1, wherein said uncapping means comprises a laser.

6. An apparatus for uncapping wax from both sides of a honeycomb, said apparatus comprising:
   a pair of rotatable flails arranged to receive a honeycomb in a nip defined between said flails;
   first endless conveyor means for delivering a honeycomb along a delivery path to said pair of rotatable flails, said first endless conveyor means spaced from said nip in a direction of said delivery path;
   second endless conveyor means for moving a honeycomb away from said pair of rotatable flails along a removal path, said second endless conveyor means located opposite of said pair of rotatable flails from said first endless conveyor means, said second endless conveyor means spaced from said nip in a direction of said removal path so that said pair of rotatable flails are located in a gap defined between said first and second endless conveyors;
   said first and second endless conveyor means being disposed to receive honeycombs laid with a longitudinal plane substantially parallel to at least one of said first and second conveyor means such that said honeycombs are supported with one longitudinal face against said at least one of the first and second conveyor means;
   means for driving said first and second endless conveyor means; and
   means for rotatively driving said pair of rotatable flails.

7. The apparatus as claimed in claim 6, wherein said flail means includes means for urging a honeycomb across said gap.

8. The apparatus as claimed in claim 6, wherein said delivery and removal paths lie in a common horizontal plane and said first and second endless conveyor means include means for supporting a honeycomb on one of the sides of the honeycomb so that at said gap the honeycomb is disposed horizontally.

9. The apparatus as claimed in claim 8, wherein said first and second endless conveyor means comprise endless belts of spaced apart, transverse links, said spaced apart links adapted to permit material from a honeycomb to pass between said links.

10. The apparatus as claimed in claim 9, wherein said conveyor drive means include first and second drive wheels operatively connected with said first and second endless conveyor means, respectively, and first and second motors connected directly to said first and second drive wheels, respectively.

11. The apparatus as claimed in claim 6, wherein said pair of flails are wider than said first and second endless conveyor means so that said flails project entirely across said first and second conveyor means.

12. The apparatus as claimed in claim 6, wherein a flail comprises a shaft and a plurality of rows of chain pieces connected with said shaft, so that upon rotation of said shaft, said chain pieces are extended radially outwardly from said shaft, said shaft spaced from and transverse to said delivery path.

13. The apparatus as claimed in claim 12, wherein said each row is connected with said shaft by a rod and a plurality of annuluses, said annuluses affixed to said shaft at a plurality of spaced locations along said shaft, said rod disposed parallel to said shaft and attached to said annuluses, said annuluses dividing said plurality of chains into predetermined groups of chains.

14. The apparatus as claimed in claim 13, wherein said flail includes three rods located symmetrically about said shaft.

15. The apparatus as claimed in claim 14, wherein each chain has a free end and an opposite end connected with said rod.

16. The apparatus as claimed in claim 15, wherein each chain has four links.

17. The apparatus as claimed in claim 6, wherein said flail drive means comprises a variable speed motor directly driving a flail.

18. The apparatus as claimed in claim 17, wherein said flail drive means further comprises means for loading said variable speed motor so that said motor can switch to a lower speed.

19. The apparatus as claimed in claim 18, wherein said loading means includes a fan driven by said variable speed motor, said fan directed to cool said variable speed motor.

20. The apparatus as claimed in claim 6, further comprising a pivotal hold-down member spaced above and transverse to said delivery path at an intermediate location along said delivery path.

21. A method of uncapping wax from both sides of a honeycomb, said method comprising the steps of:
 laying a honeycomb to be decapped on a first conveyor with a longitudinal plane of said honeycomb substantially parallel to said first conveyor and such that the honeycomb is supported with one longitudinal face against the conveyor;
 conveying the honeycomb along a path defined by the first conveyor, a second conveyor, and a gap between said first and second conveyors;
 removing caps from both sides of the honeycomb at said gap free of interference from said first and second conveyors by a cap removing device at least partially disposed in said gap.

* * * * *